() United States Patent  
Xia et al.

(10) Patent No.: US 11,879,780 B2  
(45) Date of Patent: Jan. 23, 2024

(54) COHERENT ANTI-STOKES RAMAN SCATTERING MICROSCOPE IMAGING APPARATUS

(71) Applicant: WEIPENG (SUZHOU) MEDICAL DEVICES CO., LTD., Suzhou (CN)

(72) Inventors: Yan Xia, Suzhou (CN); Bin Yang, Suzhou (CN); Rui Li, Suzhou (CN)

(73) Assignee: WEIPENG (SUZHOU) MEDICAL DEVICES CO., LTD., Jiangsu (CN)

( * ) Notice: Subject to any disclaimer, the term of this patent is extended or adjusted under 35 U.S.C. 154(b) by 172 days.

(21) Appl. No.: 17/598,211

(22) PCT Filed: Nov. 21, 2019

(86) PCT No.: PCT/CN2019/120051  
§ 371 (c)(1),  
(2) Date: Sep. 24, 2021

(87) PCT Pub. No.: WO2020/192153  
PCT Pub. Date: Oct. 1, 2020

(65) Prior Publication Data  
US 2022/0178750 A1  Jun. 9, 2022

(30) Foreign Application Priority Data

Mar. 27, 2019 (CN) .......................... 201910236685.2

(51) Int. Cl.  
*G01J 3/44* (2006.01)  
*G01J 3/02* (2006.01)  
(Continued)

(52) U.S. Cl.  
CPC ........... *G01J 3/4412* (2013.01); *G01J 3/0208* (2013.01); *G01J 3/10* (2013.01); *G01N 21/65* (2013.01);  
(Continued)

(58) Field of Classification Search  
CPC .......... G01J 3/4412; G01J 3/0208; G01J 3/10; G01N 21/65; G01N 2021/653;  
(Continued)

(56) References Cited

U.S. PATENT DOCUMENTS 5,170,204 A * 12/1992 Mukai .................... G03B 17/20  
                               396/296  
2008/0029497 A1* 2/2008 Eda ........................ B23K 26/53  
                              219/121.68  
(Continued)

FOREIGN PATENT DOCUMENTS

CN    102116929 A    7/2011  
CN    108747057 A    11/2018  
(Continued)

OTHER PUBLICATIONS

Written Opinion of the ISA, dated Feb. 26, 2020 for corresponding International Application No. PCT/CN2019/120051 with English translation (8 pages).

(Continued)

*Primary Examiner* — Kevin Quarterman  
*Assistant Examiner* — Akbar Hassan Rizvi  
(74) *Attorney, Agent, or Firm* — Intellectual Property Law Group LLP

(57) ABSTRACT

A coherent anti-Stokes Raman scattering microscope imaging apparatus, comprising: a laser light source (21), a two-dimensional oscillating mirror assembly (22), a first light dichroic mirror plate (23), an objective lens (24), a sample translation platform (25), a collection device (26), and a data processing module; the laser light source (21) is used for producing a first laser beam and a second laser beam; the first laser beam and the second laser beam are coaxially emitted and are incident on the two-dimensional oscillating mirror assembly (22); the first laser beam and the (Continued)

second laser beam leaving the two-dimensional oscillating mirror assembly pass through the first light dichroic mirror plate (23) and the objective lens (24); the objective lens (24) focuses the first laser beam and the second laser beam onto the sample translation platform; the signal light produced on the sample translation platform (25) passes through the objective lens (24).

9 Claims, 4 Drawing Sheets

(51) Int. Cl.
*G01J 3/10* (2006.01)
*G01N 21/65* (2006.01)
*G02B 21/00* (2006.01)
*G02B 21/18* (2006.01)

(52) U.S. Cl.
CPC ......... *G02B 21/006* (2013.01); *G02B 21/008* (2013.01); *G02B 21/0048* (2013.01); *G02B 21/18* (2013.01); *G01N 2021/653* (2013.01)

(58) Field of Classification Search
CPC .............. G02B 21/0048; G02B 21/006; G02B 21/008; G02B 21/18
See application file for complete search history.

(56) References Cited

U.S. PATENT DOCUMENTS

| | | | |
|---|---|---|---|
| 2011/0001963 | A1 | 1/2011 | Durack |
| 2012/0280143 | A1* | 11/2012 | Kim .................. G01J 3/0229 |
| | | | 250/208.2 |
| 2017/0013186 | A1 | 1/2017 | Norris et al. |
| 2019/0011365 | A1* | 1/2019 | Ge .................. G02B 21/0076 |

FOREIGN PATENT DOCUMENTS

| | | |
|---|---|---|
| CN | 108827940 A | 11/2018 |
| CN | 108964781 A | 12/2018 |
| CN | 108971747 A | 12/2018 |
| CN | 109765213 A | 5/2019 |
| CN | 209707380 U | 11/2019 |
| JP | 2019035859 A * | 3/2019 |
| JP | 2019035859 A | 3/2019 |
| WO | WO 2008/036710 A2 | 3/2008 |

OTHER PUBLICATIONS

European Office Action dated Oct. 7, 2022 for corresponding European application No. 19921372.9.
International Search Report, dated Feb. 26, 2020 for corresponding International Application No. PCT/CN2019/120051 with English translation (4 pages).
China Office Action dated Aug. 11, 2023 for corresponding Chinese application No. 201910236685.2 with English translation (total 23 pages)

* cited by examiner

US 11,879,780 B2

COHERENT ANTI-STOKES RAMAN SCATTERING MICROSCOPE IMAGING APPARATUS

CROSS-REFERENCE TO RELATED APPLICATIONS

The present application is a national stage of International Application No. PCT/CN2019/120051 filed on Nov. 21, 2019, which claims priority to Chinese patent application No. 201910236685.2, filed on Mar. 27, 2019. Both applications are incorporated herein by reference in their entireties.

TECHNICAL FIELD

The present disclosure relates to an optical microscopic imaging technique, in particular to a coherent anti-Stokes Raman scattering microscope imaging apparatus.

BACKGROUND

Optical microscope imaging systems have been widely used in the field of materials science and biomedical field because of their high spatial resolution. In recent years, coherent anti-Stokes Raman Scattering Microscope (CARS Microscope), which is based on the characteristics of internal vibration of molecules, has become a powerful tool for molecular research because of its advantages of no usage of fluorescent probes and high sensitivity. Referring to FIG. 4 of the accompanying drawings, the CARS process is a four-wave mixing nonlinear optical process based on the third-order nonlinear optical effect. Two femtosecond/picosecond laser pulses with different center frequencies are usually used as the pump light ($\omega P$) and the Stokes light ($\omega S$) to excite the molecular bond resonance of the sample to be measured. When the frequency difference ($\omega vib$) of the two beams of light coincides with the natural vibration frequency of the molecule in the sample to be measured, the natural vibration frequency of the molecule is enhanced, and then the anti-Stokes signal ($\omega CARS$) is generated under the action of the probe light ($\omega PR$). The traditional coherent anti-Stokes Raman scattering microscope imaging system uses a near-infrared Ti: Sapphire pulsed laser as the laser source, which has a relatively bulky size and a relatively complex optical path, which is not conducive to the commercial development and application of this technology.

SUMMARY

Accordingly, it is necessary to provide a coherent anti-Stokes Raman scattering microscope imaging device with a compact structure.

A coherent anti-Stokes Raman scattering microscope imaging device includes a laser light source, a two-dimensional galvanometer assembly, a first dichroic mirror, an objective lens, a sample translation platform, a collector, and a data processing module; the laser light source is configured to generate a first laser beam and a second laser beam; the first laser beam and the second laser beam are output collinearly; the first laser beam and the second laser beam are incident on the two-dimensional galvanometer assembly, wherein the two-dimensional galvanometer assembly adjusts the optical paths of the first laser beam and the second laser beam; the first laser beam and the second laser beam leaving the two-dimensional galvanometer assembly passes through the first dichroic minor and the objective lens successively; the objective lens focuses the first laser beam and the second laser beam onto the sample translation platform; a signal light generated by the sample translation platform passes through the objective lens, the first dichroic minor reflects the signal light to the collector, and the collector generates initial data according to the signal light, and outputs the initial data to the data processing module.

The aforementioned coherent anti-Stokes Raman scattering microscope imaging device generates the first laser beam and the second laser beam via the laser light source, the first laser beam and the second laser beam are output collinearly, and the first laser beam is used as the pump light, the second laser beam is used as the Stokes light, which simplifies the optical path structure between the laser and the objective lens, avoids the need to split light and adjust the wavelength for the single-wavelength laser beam output by the laser, thereby facilitating the improvement of the compactness of the coherent anti-Stokes Raman scattering microscope imaging device and reducing the volume, which are conducive to commercial development.

In one of the embodiments, the coherent anti-Stokes Raman scattering microscope imaging device further includes an automatic focusing mechanism, the automatic focusing mechanism includes a focus detection unit, a second dichroic mirror and a moving assembly; the second dichroic mirror is arranged in correspondence with the first dichroic minor and the objective lens, respectively; the first laser beam and the second laser beam are reflected to the objective lens through the second dichroic minor after passing through the first dichroic minor; the signal light is reflected to the first dichroic minor through the second dichroic mirror after passing through the objective lens; the focus detection unit generates a third laser beam that transmits through the second dichroic minor; the third laser beam is focused on the sample translation platform through the objective lens, and the third laser beam generates a reflected light on the sample translation platform; the reflected light returns to the focus detection unit along the original path of the third laser beam; the focus detection unit detects the reflected light; the objective lens is mounted on the moving assembly; the moving assembly moves the objective lens according to a detection result of the focus detection unit.

In one of the embodiments, the coherent anti-Stokes Raman scattering microscope imaging device further includes a manual focusing assembly, wherein the manual focusing assembly includes an indicating light source, a first convex lens, and a CCD camera; the indicating light source is arranged on one side of the sample translation platform; the indicating light source generates a reference light that passes through the objective lens and the second dichroic mirror; the first convex lens focuses the reference light into the CCD camera.

In one of the embodiments, the coherent anti-Stokes Raman scattering microscope imaging device further includes a main housing; the laser light source, the two-dimensional galvanometer assembly, the first dichroic mirror, the objective lens, the sample translation platform, the collector, the automatic focusing mechanism and the manual focusing assembly are installed in the main housing.

In one of the embodiments, the automatic focusing mechanism further comprises a first reflector, wherein the first reflector is arranged in correspondence with the second dichroic mirror and the focus detection unit, respectively, and the third laser beam and the reflected light are reflected on the first reflector.

In one of the embodiments, the first reflector is plated with gold or silver.

In one of the embodiments, the coherent anti-Stokes Raman scattering microscope imaging device further includes a narrow-band dichroic minor arranged between the first dichroic mirror and the collector; the signal light transmits through the narrow-band dichroic minor and enters the collector; the narrow-band dichroic mirror absorbs or reflects the first laser beam and the second laser beam.

In one of the embodiments, the coherent anti-Stokes Raman scattering microscope imaging device further includes a 4F system located between the two-dimensional galvanometer assembly and the first dichroic mirror.

In one of the embodiments, the coherent anti-Stokes Raman scattering microscope imaging device further includes an adjustment assembly, wherein after the first laser beam and the second laser beam are emitted from the laser light source, the first laser beam and the second laser beam are reflected to the two-dimensional galvanometer assembly through the adjustment assembly.

In one of the embodiments, the adjustment assembly includes a second reflector and a third reflector, wherein the first laser beam and the second laser beam are reflected to the two-dimensional galvanometer assembly through the second reflector and the third reflector successively.

DETAILED DESCRIPTION OF THE EMBODIMENTS

In order to facilitate the understanding of the present disclosure, the present disclosure will be described more completely hereinafter. However, the present disclosure may be embodied in many different forms and is not limited to the embodiments described herein. Rather, these embodiments are provided so that the understanding of the disclosure of the present disclosure will be more thorough and complete.

Unless defined otherwise, all technical and scientific terms used herein have the same meaning as commonly understood by people who are skilled in the art to which the present disclosure belongs. The terms used herein in the specification of the present disclosure is only for the purpose of describing specific embodiments, and is not intended to limit the present disclosure.

Figure 1:
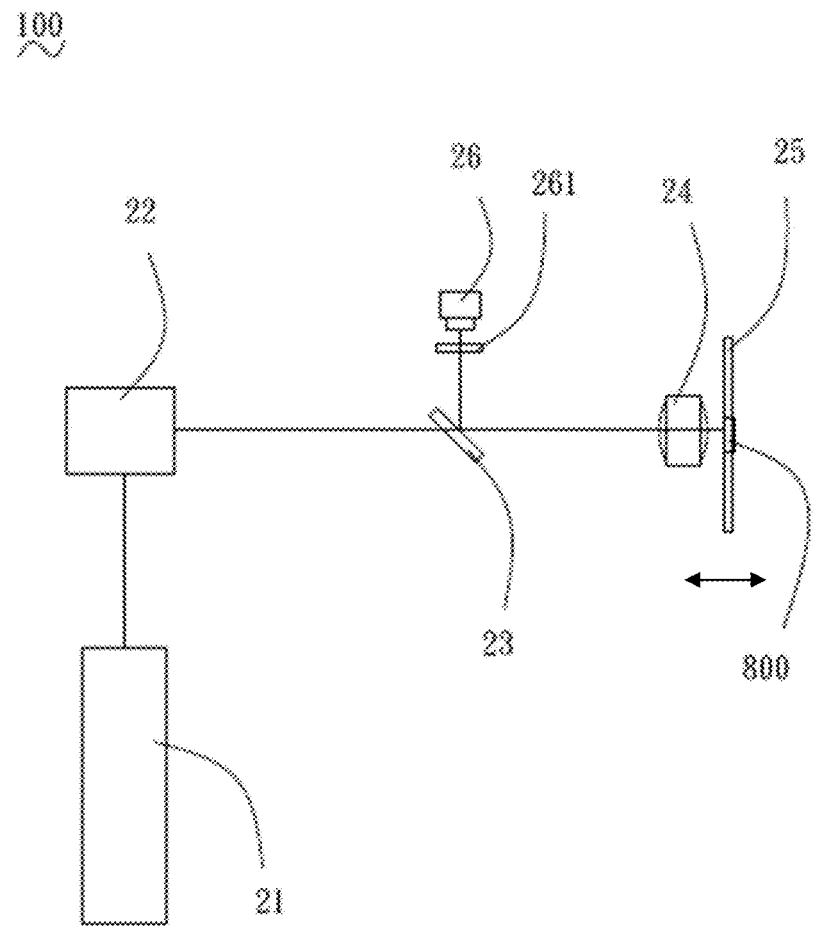
FIG. 1 is a schematic view of a coherent anti-Stokes Raman scattering microscope imaging device according to an embodiment of the present disclosure.

FIG. 1 is a coherent anti-Stokes Raman scattering microscope imaging device 100 according to an embodiment of the present disclosure, which is used to obtain microscopic image information of a sample 800. The coherent anti-Stokes Raman scattering microscope imaging device 100 includes a laser light source 21, a two-dimensional galvanometer assembly 22, a first dichroic mirror 23, an objective lens 24, a sample translation platform 25, a collector 26, and a data processing module. The laser light source 21 is configured to generate a first laser beam and a second laser beam. The first laser beam and the second laser beam are output collinearly. The first laser beam is used as a pump light, and the second laser beam is used as a Stokes light. The first laser beam and the second laser beam are incident on the two-dimensional galvanometer assembly 22, and the two-dimensional galvanometer assembly 22 adjusts optical paths of the first laser beam and the second laser beam. The first laser beam and the second laser beam leaving the two-dimensional galvanometer assembly 22 pass through the first dichroic mirror 23 and the objective lens 24 successively. The first laser beam and the second laser beam transmit through the first dichroic mirror 23. The objective lens 24 focuses the first laser beam and the second laser beam onto the sample translation platform 25. The sample 800 on the sample translation platform 25 generates a signal light under the action of the first laser beam and the second laser beam. After the signal light passes through the objective lens 24, the first dichroic mirror 23 reflects the signal light to the collector 26, the collector 26 generates initial data according to the signal light, and the initial data is output to the data processing module.

The first laser beam and the second laser beam are generated via the laser light source 21. The first laser beam and the second laser beam are output collinearly, and the first laser beam is used as the pump light, the second laser beam is used as Stokes light, which simplifies the optical path structure between the laser and the objective lens 24, avoids the need to split light and adjust the wavelength for the single-wavelength laser beam output by the laser, thereby facilitating the improvement of the compactness of the coherent anti-Stokes Raman scattering microscope imaging device 100 and reducing the volume, which are conducive to commercial development.

Figure 2:
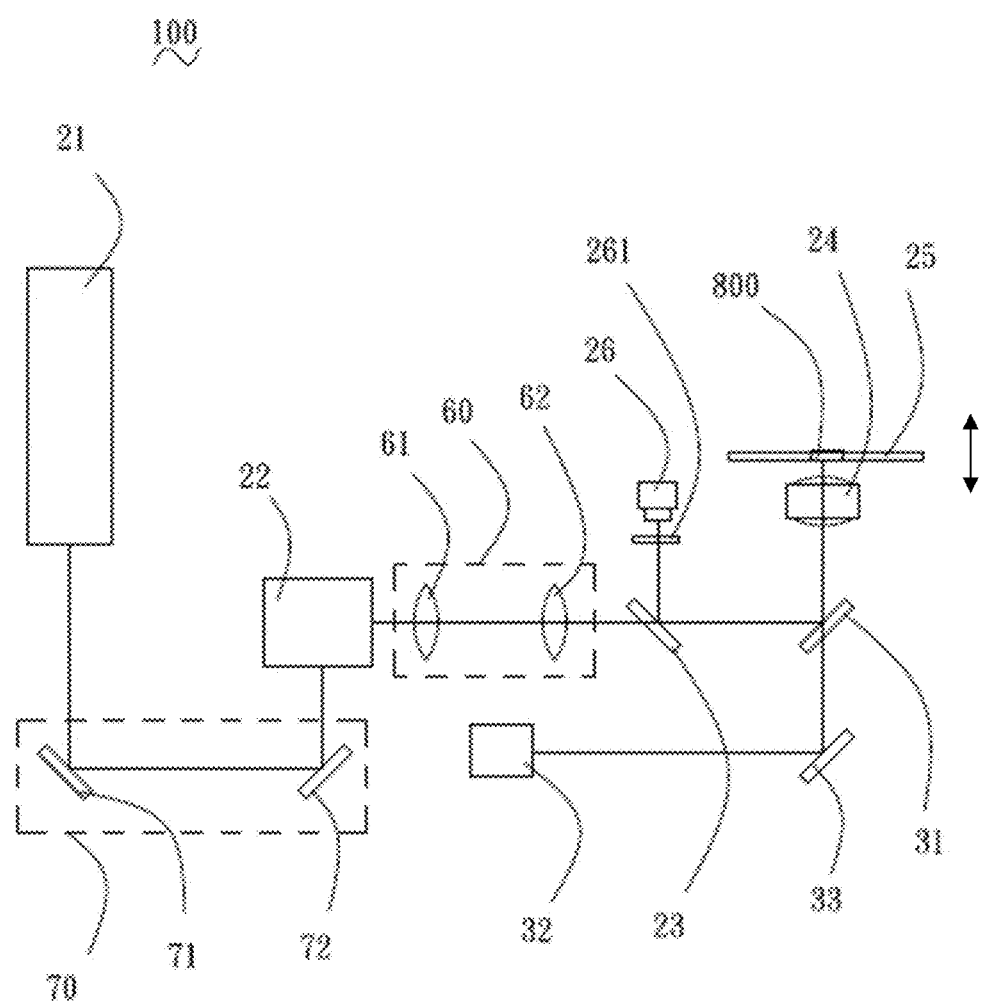
FIG. 2 is a schematic view of the coherent anti-Stokes Raman scattering microscope imaging device shown in FIG. 1 after adding an automatic focusing mechanism.

Referring to FIG. 2, in one of the embodiments, in order to accurately focus the first laser beam and the second laser beam on the sample 800 on the sample translation platform 25 through the objective lens 24, the coherent anti-Stokes Raman scattering microscope imaging device 100 also includes an automatic focusing mechanism. The automatic focusing mechanism includes a focus detection unit 32, a second dichroic minor 31, and a moving assembly. The second dichroic minor 31 is arranged in correspondence with the first dichroic minor 23 and the objective lens 24, respectively. The first laser beam and the second laser beam are reflected to the objective lens 24 through the second dichroic minor 31 after passing through the first dichroic minor 23. The signal light is reflected to the first dichroic minor 23 through the second dichroic minor 31 after passing through the objective lens 24. The focus detection unit 32 generates a third laser beam. The third laser beam transmits through the second dichroic mirror 31, and the third laser beam is parallel or collinear with the first laser beam and the second laser beam after transmitting through the second dichroic mirror 31. The third laser beam is focused on the sample translation platform 25 through the objective lens 24, and the third laser beam generates a reflected light on the sample translation platform 25. The reflected light returns to the focus detection unit 32 along the original path of the third laser beam. The focus detection unit 32 detects the reflected light. The objective lens 24 is mounted on the moving assembly. The moving assembly moves the objective lens 24 according to a detection result of the focus detection unit 32 to adjust the distance between the objective lens 24 and the sample translation platform 25.

Specifically, the reflected light is formed by the third laser beam reflected on the surface of the sample 800. By adjusting the objective lens 24, the third laser beam has a good focusing effect on the sample 800. At the same time, since the third laser beam is parallel or collinear with the first laser beam and the second laser beam after transmitting through the second dichroic minor 31, the first laser beam and the second laser beam can also have a good focusing effect on the sample 800 after the adjustment of the objective lens 24 is completed. Optionally, the focus detection unit 32 can generate the detection result according to the intensity of the reflected light or the image clarity, etc. The second dichroic minor 31 is arranged in correspondence with the first dichroic mirror 23 and the objective lens 24, respectively, and the automatic focusing mechanism adjusts the position of the objective lens 24 before the laser light source 21 emits the first laser beam and the second laser beam, thereby realizing the coexistence of automatic focusing and anti-Stokes signal light, shortening the data collecting time, and benefiting the detection of large-area samples 800, wherein the use process is simple and time-saving, which is convenient for the operator to use. Further, the objective lens 24 can be remotely programmed and controlled.

In one of the embodiments, in order to rationally arrange the automatic focusing mechanism and improve the compactness of the coherent anti-Stokes Raman scattering microscope imaging device 100, the automatic focusing mechanism further includes a first reflector 33, which is arranged in correspondence with the second dichroic mirror 31 and the focus detection unit 32, respectively. The third laser beam and the reflected light are reflected on the first reflector 33; thus, the position of the focus detection unit 32 can be adjusted to improve the overall compactness of the coherent anti-Stokes Raman scattering microscope imaging device 100. Specifically, the first convex lens 42 and the third dichroic mirror 44 are located between the focus detection unit 32 and the first reflector 33, and a reference light that passes through the objective lens 24 is reflected to the first convex lens 42 through the first reflector 33.

In one of the embodiments, in order to improve the reflection effect of the first reflector 33 on the third laser beam, the reflected light or the reference light, the first reflector 33 is plated with gold or silver. In order to further improve the reflection ability of the first reflector 33, the first reflector 33 is also plated with a special dielectric film.

In one of the embodiments, in order to improve the receiving efficiency of the collector 26, the coherent anti-Stokes Raman scattering microscope imaging device 100 further includes a narrow-band dichroic mirror 261 arranged between the first dichroic mirror 23 and the collector 26. The signal light transmits through the narrow-band dichroic mirror 261 and enters the collector 26. The narrow-band dichroic mirror 261 absorbs or reflects the first laser beam and the second laser beam, thereby preventing the first laser beam and the second laser beam from affecting the sampling of the collector 26 and improves the quality of the initial data output. Specifically, the narrow-band dichroic mirror 261 is plated with a dielectric film to achieve high transmittance of signal light, and low transmittance of the pump light and the Stokes light. In this embodiment, the OD of the narrow-band dichroic mirror 261 is between 6 and 8.

In one of the embodiments, in order to match the output spot of the laser light source 21 with the objective lens 24, the coherent anti-Stokes Raman scattering microscope imaging device 100 further includes a 4F system 60 located between the two-dimensional galvanometer assembly 22 and the first dichroic mirror 23. The output spot of the laser light source 21 is amplified via the 4F system 60, such that the size of the output spot of the laser light source 21 matches the aperture of the objective lens 24, such that the spot size obtained by focusing via the objective lens 24 has an appropriate size to improve the microscopic effect of the coherent anti-Stokes Raman scattering microscope imaging device 100. The 4F system 60 includes at least two convex lenses to achieve the expansion of the first laser beam and the second laser beam and projection thereof to the objective lens 24. In this embodiment, the 4F system 60 includes a second convex lens 61 and a third convex lens 62. The focal length of the second convex lens 61 is smaller than the focal length of the third convex lens 62. The distance between the second convex lens 61 and the third convex lens 62 should be the sum of the focal lengths thereof.

In one of the embodiments, in order to make the first laser beam and the second laser beam accurately enter the two-dimensional galvanometer assembly 22, the coherent anti-Stokes Raman scattering microscope imaging device 100 further includes an adjustment assembly 70. After the first laser beam and the second laser beam are emitted from the laser light source 21, the first laser beam and the second laser beam are reflected to the two-dimensional galvanometer assembly 22 through the adjustment assembly 70.

In one of the embodiments, in order to make the first laser beam and the second laser beam enter the two-dimensional galvanometer assembly 22 at a predetermined angle, the adjustment assembly 70 includes a second reflector 71 and a third reflector 72. The first laser beam and the second laser beam are reflected to the two-dimensional galvanometer assembly 22 through the second reflector 71 and the third reflector 72 successively. During the assembly process of the coherent anti-Stokes Raman scattering microscope imaging device 100, after the laser light source 21 is fixed, the reflection points of the first laser beam and the second laser beam on the third reflector 72 can be adjusted via adjusting the angle of the second reflector 71, and the angle of the first laser beam and the second laser beam entering the two-dimensional galvanometer assembly 22 can be adjusted by adjusting the angle of the third reflector 72. Specifically, the surfaces of the second reflector 71 and the third reflector 72 are plated with a dielectric film to improve the reflectivity of the first laser beam and the second laser beam.

Figure 3:
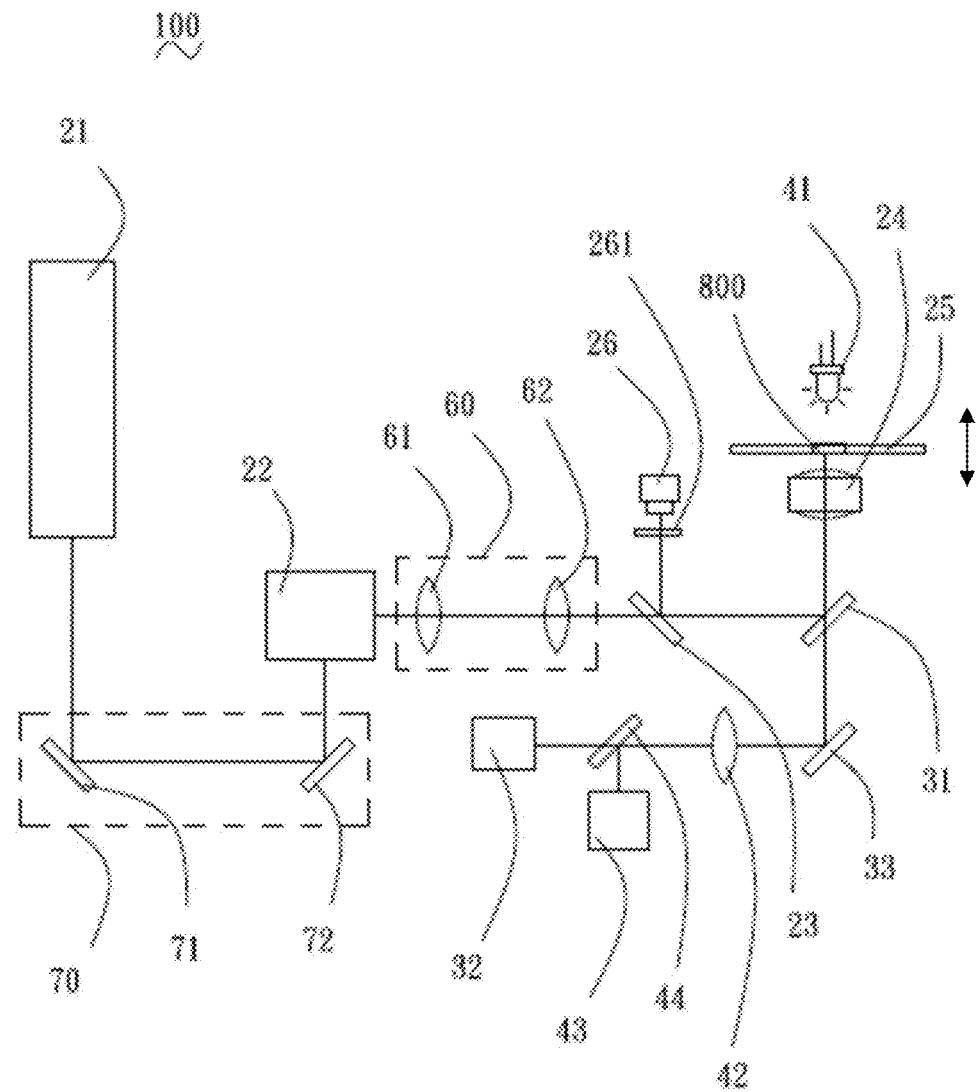
FIG. 3 is a schematic view of the coherent anti-Stokes Raman scattering microscope imaging device shown in FIG. 2 after adding a manual focusing assembly.
Figure 4:
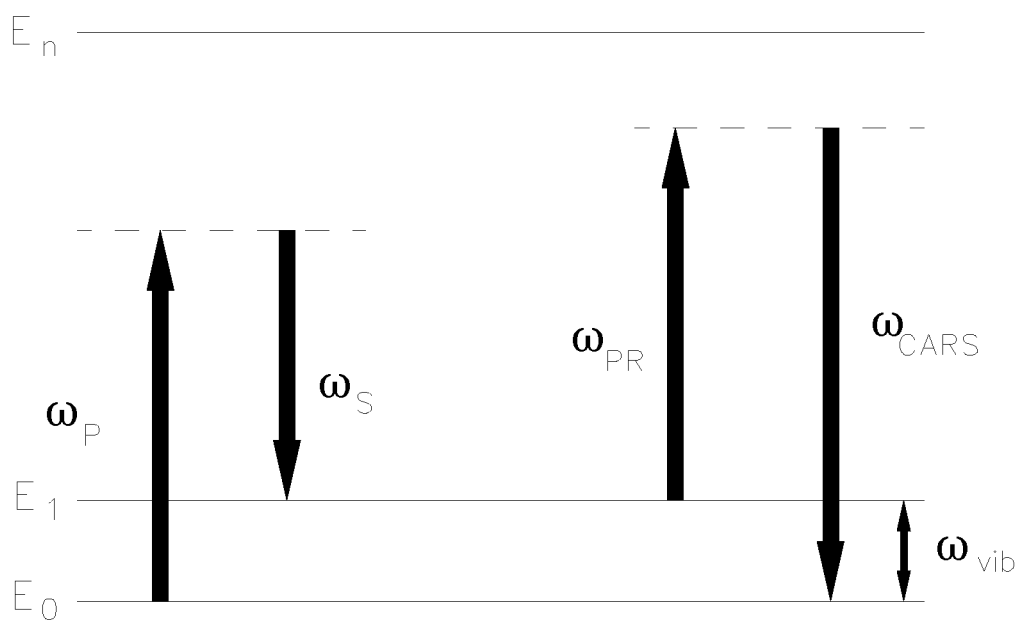
FIG. 4 is an energy level diagram of a coherent anti-Stokes Raman scattering process.

Referring to FIG. 3, in one of the embodiments, in order to adjust the focus manually when necessary, the coherent anti-Stokes Raman scattering microscope imaging device 100 further includes a manual focusing assembly. The manual focusing assembly includes an indicating light source 41, a first convex lens 42, and a CCD camera 43. The indicating light source 41 is arranged on one side of the sample translation platform 25. The indicating light source 41 generates the reference light, and the reference light passes through the objective lens 24 and the second dichroic mirror 31. The first convex lens 42 focuses the reference light to enter the CCD camera 43. When manually adjusting the focus, the CCD camera 43 obtains the image of the sample 800 on the sample translation platform 25 according to the reference light, and the debugging personnel determines whether the manual focus adjustment is accurate according to the sharpness of the image of the sample 800; specifically, the indicating light source 41 is a white light LED device. The focal length and installation position of the first convex lens 42 match the size of the sensing unit of the CCD camera 43. Specifically, the size and resolution of the sensing unit of the CCD camera 43 is arranged in correspondence with the resolution of the objective lens 24.

Further, in order to improve the compactness of the coherent anti-Stokes Raman scattering microscope imaging device 100, the manual focusing assembly further includes a third dichroic mirror 44. The first convex lens 42 and the third dichroic mirror 44 are located on the optical path of the third laser beam, the third dichroic mirror 44 is located between the focus detection unit 32 and the first convex lens 42. The third laser beam and the reflected light transmit through the third dichroic mirror 44, respectively. After the reference light is focused by the first convex lens 42, the third dichroic mirror 44 reflects the reference light, and causes the reference light to enter the CCD camera 43, such that the optical paths of the third laser beam, such that the third laser beam, the reflected light, and the reference light overlap.

In one of the embodiments, the coherent anti-Stokes Raman scattering microscope imaging device 100 further includes a main housing. The laser light source 21, the two-dimensional galvanometer assembly 22, the first dichroic mirror 23, the objective lens 24, the sample translation platform 25, the collector 26, the data processing module, the automatic focusing mechanism, and the manual focusing assembly are installed in the main housing; thus, effective protection is provided for important assemblies or mechanisms.

Specifically, in order to use air cooling to reduce temperature and improve compactness, the laser light source 21 is a femtosecond pulsed fiber laser or a picosecond pulsed fiber laser. In one of the embodiments, the laser light source 21 is a Dual Color laser from Refined Laser Company, Germany. The first laser beam and the second laser beam are output synchronously in time and space; in this embodiment, the first laser beam is also used as probe light.

In one of the embodiments, the laser light source 21 outputs the first laser beam of 800 nm as the pump light and the second laser beam of 1040 nm as the Stokes light, and the obtained signal light has a wavelength of 652 nm. This embodiment can realize the detection and imaging of substances containing C—H chemical bonds.

In one of the embodiments, the laser light source 21 can output the first laser beam with an adjustable wavelength of 780-900 nm as the pump light, and output the second laser beam with a wavelength of 1040 nm as the Stokes light. This embodiment can achieve detection and imaging of substances containing C—H and C—D chemical bonds.

In one of the embodiments, the laser light source 21 can output a second laser beam with an adjustable wavelength of 930-1030 nm as the Stokes light, and output a first laser beam with a wavelength of 780 nm as the pump light. This embodiment can achieve detection and imaging of substances containing C—H and C—D chemical bonds. In this embodiment, the first dichroic mirror 23 and the third dichroic mirror 44 are long-wave dichroic mirrors, and the surface of the first dichroic mirror 23 is plated with a dielectric film to achieve high transmittance of the long-wavelength and reflection of the short-wavelength, so as to ensure that the pump light and Stokes light can pass through, and the anti-Stokes signal light can be reflected. The second dichroic mirror 31 is a short-wave dichroic mirror, and the surface of the second dichroic mirror 31 is plated with a dielectric film to achieve the reflection of the first laser beam, the second laser beam and the signal light, while realizing the passage of the third laser beam, the reflected light and the reference light. The wavelength distribution of the third laser beam matches the second dichroic mirror 31 and the third dichroic mirror 44.

The sample 800 is placed on the sample translation platform 25. The sample 800 can be moved to a scanning range of the two-dimensional galvanometer assembly 22 by the movement of the sample translation platform 25, and the scanning range of the sample translation platform 25 can be adjusted according to the size of the sample 800 and actual application requirements. Further, the sample translation platform 25 can be remotely programmed and controlled. The size of the mirror surface of the two-dimensional galvanometer assembly 22 should be larger than the spot size of the laser light source 21, and the scanning angle can be adjusted according to the scanning range of the sample 800. The two-dimensional galvanometer assembly 22 adjusts the optical paths of the first laser beam and the second laser beam, such that the first laser beam and the second laser beam can be transmitted to different parts within the scanning range of the surface of the sample 800. The collector 26 generates initial data corresponding to different parts of the sample after each adjustment of the two-dimensional scanning assembly 800.

Specifically, the collector 26 is a photomultiplier tube, and has the function of oversaturation shutdown, manual opening and remote opening; the data processing module integrates the initial data collected by the collector 26 into complete image information, and in this embodiment, the data processing module is a computer.

In this embodiment, the first laser beam and the second laser beam are generated via the laser light source, the first laser beam and the second laser beam are output collinearly, and the first laser beam is used as the pump light, and the second laser beam is used as Stokes light, which simplifies the optical path structure between the laser and the objective lens, avoids the need to split light and adjust the wavelength for the single-wavelength laser beam output by the laser, thereby facilitating the improvement of the compactness of the coherent anti-Stokes Raman scattering microscope imaging device and reduced the volume, which are conducive to commercial development.

The technical features of the embodiments described above may be arbitrarily combined. For the sake of brevity of description, not all possible combinations of the technical features in the aforementioned embodiments are described. However, as long as there is no contradiction between the combinations of these technical features, all should be considered as the scope of this specification.

The aforementioned examples only express several implementation of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure. Therefore, the protection scope of the present disclosure shall be subject to the appended claims.

What is claimed is:

1. A coherent anti-Stokes Raman scattering microscope imaging device, comprising:
    a laser light source, a two-dimensional galvanometer assembly, a first dichroic mirror, an objective lens, a sample translation platform, a collector, a data processing module, and an automatic focusing mechanism;
    wherein the laser light source is configured to generate a first laser beam and a second laser beam; the first laser beam and the second laser beam are output collinearly; the first laser beam and the second laser beam are incident on the two-dimensional galvanometer assembly, wherein the two-dimensional galvanometer assembly adjusts optical paths of the first laser beam and the second laser beam; the first laser beam and the second laser beam leaving the two-dimensional galvanometer assembly pass through the first dichroic mirror and the objective lens successively; the objective lens focuses the first laser beam and the second laser beam onto the sample translation platform; a signal light generated by the sample translation platform passes through the objective lens, the first dichroic mirror reflects the signal light to the collector, the collector generates initial data according to the signal light, and outputs the initial data to the data processing module; and wherein the automatic focusing mechanism comprises a focus detection unit, a second dichroic minor, and a moving assembly; the second dichroic mirror is arranged in correspondence with the first dichroic minor and the objective lens, respectively; the first laser beam and the second laser beam are reflected to the objective lens through the second dichroic minor after passing through the first dichroic minor; the signal light is reflected to the first dichroic mirror through the second dichroic mirror after passing through the objective lens; the focus detection unit generates a third laser beam that transmits through the second dichroic mirror; the third laser beam is focused on the sample translation platform through the objective lens, and the third laser beam generates a reflected light on the sample translation platform; the reflected light returns to the focus detection unit along an original path of the third laser beam; the focus detection unit detects the reflected light; the objective lens is mounted on the moving assembly; the moving assembly moves the objective lens according to a detection result of the focus detection unit.

2. The coherent anti-Stokes Raman scattering microscope imaging device according to claim 1, further comprising a manual focusing assembly, wherein the manual focusing assembly comprises an indicating light source, a first convex lens, and a CCD camera; the indicating light source is arranged on one side of the sample translation platform; the indicating light source generates a reference light that passes through the objective lens and the second dichroic mirror; the first convex lens focuses the reference light into the CCD camera.

3. The coherent anti-Stokes Raman scattering microscope imaging device according to claim 2, further comprising a main housing; wherein the laser light source, the two-dimensional galvanometer assembly, the first dichroic minor, the objective lens, the sample translation platform, the collector, the automatic focusing mechanism and the manual focusing assembly are installed in the main housing.

4. The coherent anti-Stokes Raman scattering microscope imaging device according to claim 1, wherein the automatic focusing mechanism further comprises a first reflector, the first reflector is arranged in correspondence with the second dichroic minor and the focus detection unit, respectively, and the third laser beam and the reflected light are reflected on the first reflector.

5. The coherent anti-Stokes Raman scattering microscope imaging device according to claim 4, wherein the first reflector is plated with gold or silver.

6. The coherent anti-Stokes Raman scattering microscope imaging device according to claim 1, further comprising a narrow-band dichroic mirror arranged between the first dichroic minor and the collector, wherein the signal light transmits through the narrow-band dichroic mirror and enters the collector; the narrow-band dichroic minor absorbs or reflects the first laser beam and the second laser beam.

7. The coherent anti-Stokes Raman scattering microscope imaging device according to claim 1, further comprising a 4F system located between the two-dimensional galvanometer assembly and the first dichroic mirror.

8. The coherent anti-Stokes Raman scattering microscope imaging device according to claim 1, further comprising an adjustment assembly, wherein after the first laser beam and the second laser beam are emitted from the laser light source, the first laser beam and the second laser beam are reflected to the two-dimensional galvanometer assembly through the adjustment assembly.

9. The coherent anti-Stokes Raman scattering microscope imaging device according to claim 8, wherein the adjustment assembly comprises a second reflector and a third reflector, whereby the first laser beam and the second laser beam are reflected to the two-dimensional galvanometer assembly through the second reflector and the third reflector successively.

* * * * *